United States Patent
Kurose

(10) Patent No.: US 7,158,261 B2
(45) Date of Patent: Jan. 2, 2007

(54) METHOD OF AND APPARATUS FOR DISTINGUISHING TYPE OF PIXEL

(75) Inventor: Tsutomu Kurose, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 809 days.

(21) Appl. No.: 09/790,519

(22) Filed: Feb. 23, 2001

(65) Prior Publication Data

US 2001/0015826 A1 Aug. 23, 2001

(30) Foreign Application Priority Data

Feb. 23, 2000 (JP) .............................. 2000/046060

(51) Int. Cl.
*H04N 1/40* (2006.01)

(52) U.S. Cl. ...................... 358/2.1; 358/3.26

(58) Field of Classification Search ................ 382/173, 382/176, 199; 358/1.9, 2.1, 3.26
See application file for complete search history.

(56) References Cited

U.S. PATENT DOCUMENTS

| 5,016,118 | A | | 5/1991 | Nannichi |
| 5,392,365 | A | | 2/1995 | Steinkirchner |
| 5,701,364 | A | * | 12/1997 | Kanno .......................... 382/176 |
| 5,754,708 | A | * | 5/1998 | Hayashi et al. ............ 382/266 |
| 6,192,153 | B1 | * | 2/2001 | Suzuki et al. ............... 382/199 |
| 6,587,115 | B1 | * | 7/2003 | Gong et al. .................. 345/596 |

FOREIGN PATENT DOCUMENTS

| EP | 0 630 149 A1 | 12/1994 |
| EP | 0 898 414 A2 | 2/1999 |
| JP | 02-274174 | 11/1990 |
| JP | 05-344331 | 12/1993 |

OTHER PUBLICATIONS

European Search Report Dated Aug. 29, 2003.

* cited by examiner

*Primary Examiner*—Thomas D. Lee
(74) *Attorney, Agent, or Firm*—Nixon Peabody LLP; Donald R. Studebaker

(57) ABSTRACT

The types of pixels of an image made up of a plurality of pixels arranged in a first direction and a second direction substantially perpendicular to the first direction are distinguished. The image is divided into a plurality of blocks, the number of pixels which are determined to be an edge pixel in each block is counted, and whether each of pixels in each block is a halftone pixel is determined on the basis of the number of the pixels which are determined to be an edge pixel in the block. When a plurality of pixels continuous in the first direction and/or the second direction are determined to be edge pixels, the number of edge pixels in each block is modified by counting as an edge pixel only a predetermined number of pixels in the set of the pixels consisting of the continuous pixels which are determined to be an edge pixel, and whether each pixel in the block is a halftone pixel is determined on the basis of the modified number of the edge pixels in the block.

7 Claims, 5 Drawing Sheets

METHOD OF AND APPARATUS FOR DISTINGUISHING TYPE OF PIXEL

BACKGROUND OF THE INVENTION

1. Field of the Invention

This invention relates to a method of an apparatus for distinguishing the types of pixels making up an original, and more particularly to a method of and an apparatus for distinguishing the types of pixels making up an original, which are used, for instance, in a stencil printer which makes a stencil by imagewise perforating a heat-sensitive stencil material and a print is made from the stencil, and a copier or a printer in which a latent image is formed on a photosensitive medium by electrophotography or the like and a toner image obtained by developing the latent image is transferred to a printing paper or a heat-sensitive paper.

2. Description of the Related Art

In the fields of plate making and printing, there has been put into practice a process in which an original, in which binary images such as a line drawing and characters and tone images such as a picture and halftone dots mingle together (such an original will be referred to as a "complex original", hereinbelow), is read by an image scanner, a multivalued image signal sampled in a main scanning direction and a sub-scanning direction pixel by pixel is obtained, the multivalued image signal is converted into a binary image signal, and a plate or a print is made from the binary image signal.

In order to obtain a desirable output when a complex original is output through an image processing apparatus, generally, the region of the binary image is subjected to a binary image density conversion in which the density of each pixel is converted to a maximum density or a minimum density on the basis of a single threshold value, the region of the tone image is subjected to a tone image density conversion in which the density of each pixel is converted taking into account the properties of the input/output system so that the tone properties of the original image are preserved, and then the region of the binary image is binary-coded by a simple binary-coding method using a single threshold value while the region of the tone image is binary-coded by a pseudo-halftone expressing method such as a dither method and an error diffusion method. Further, since moiré is apt to be generated when a halftone picture is binary-coded by the dither method, it is not preferred that the picture region and the halftone region are subjected to density conversion by the use of the same characteristics and binary-coded by the same method.

Accordingly, it is necessary to determine the type of each region, that is, to distinguish the binary image region from the tone image region such as a halftone region and a picture region. In other words, it is necessary to distinguish the type of each pixel (the type of image which the pixel makes up) and to carry out on each pixel image processing suitable to the type of pixel. For example, pixels of a binary image should be subjected to a density conversion for a binary image so that characters are output to be high in density and pixels of a tone image should be subjected to a density conversion for a picture or a halftone image so that the tone properties of the original image are preserved.

When a complex original is used, it is necessary to precisely distinguish the types of pixels, that is, to distinguish pixels of a character, pixels of a picture or pixels of a halftone image from each other, for an image signal of one frame corresponding to one sheet of original, and to carry out image processing optimal to each type of pixels. There have been proposed various methods of distinguishing the character region, the picture region and the halftone region from each other.

For example, as a method of distinguishing whether a pixel is of a halftone region, there has been proposed a method in which whether a pixel is of a halftone region is determined on the basis of the number of edges in a reference region of a predetermined size. See, for instance, Japanese Unexamined Patent Publication Nos. 2(1990)-274174 and 5(1993)-344331.

In the method disclosed in Japanese Unexamined Patent Publication No. 2(1990)-274174, in an image signal made up of image signal components corresponding to a plurality of pixels arranged in a main scanning direction and a sub-scanning direction, whether or not the pixel is of an edge is determined pixel by pixel, the number of edge pixels (pixels of an edge) in a block including M pixels in the main scanning direction and N pixels in the sub-scanning direction, and it is determined that all the pixels in the block are a pixel of a halftone image or only the pixel at the center of the block is a pixel of a halftone image when the number of edge pixels are larger than a predetermined threshold value $th$. That is, in this method, whether each pixel is a halftone pixel (a pixel of a halftone image) is determined on the basis of the number of edge pixels in each block.

However, the method disclosed in Japanese Unexamined Patent Publication No. 2(1990)-274174 is disadvantageous in that when characters and/or line drawings coexist with halftone pictures, the character region including therein characters and line drawings can be mistaken for the halftone region. This is because when result of the edge detection in the character region and that in the halftone region are compared with each other, the number of edges in the block or the edge density (an edge characteristic value) are often the same in the character region and the halftone region though edges are successively detected in the character region whereas edges are detected at regular intervals in the halftone region, and the character region and the halftone region are different from each other in arrangement of edges. Accordingly, a part in which a number of small characters such as newspaper characters are arranged can be mistaken for a halftone region and a line drawing region in which many parallel lines are arranged in a row as in a scale can be mistaken for a halftone region.

SUMMARY OF THE INVENTION

In view of the foregoing observations and description, the primary object of the present invention is to provide a method and an apparatus which can more precisely distinguish halftone pixels from character pixels.

In accordance with the present invention, when a plurality of successive pixels in a block are determined to be an edge pixel in edge detection processing, the determination on the major pixels in the set of the successive pixels which have been determined to be an edge pixel is cancelled so that only one or a fraction of the pixels in the set is kept determined to be an edge pixel, whereby the number of edge pixels in the block or the edge pixel density in the block is modified, and then whether each pixel in the block is a halftone pixel is determined on the basis of the modified edge pixel density in the block.

That is, in accordance with a first aspect of the present invention, there is provided a method of distinguishing the types of pixels of an image made up of a plurality of pixels arranged in a first direction and a second direction substantially perpendicular to the first direction in which the image is divided into a plurality of blocks, the number of pixels which are determined to be an edge pixel in each block is counted, and whether each of pixels in each block is a halftone pixel is determined on the basis of the number of the pixels which are determined to be an edge pixel in the block, wherein the improvement comprises the steps of modifying the number of edge pixels in each block, when a plurality of pixels continuous in the first direction and/or the second direction are determined to be edge pixels, by counting only a predetermined number of pixels in the set of the pixels consisting of the continuous pixels which are determined to be an edge pixel as an edge pixel (this step will be referred to as "the modifying step", hereinbelow), and determining whether each pixel in the block is a halftone pixel on the basis of the modified number of the edge pixels in the block (this step will be referred to as "the halftone determining step", hereinbelow).

The expression "pixels are continuous" means that two pixels are positioned near each other within a predetermined pixel interval distance (the distance as represented by the number of pixel intervals, e.g., when the two pixels are positioned adjacent to each other without pixel intervening therebetween, then the distance therebetween is one pixel interval distance). That is, in this specification, in order to be expressed that the two pixels are continuous, the two pixels need not be directly adjacent to each other (strictly speaking, pixels are inherently discontinuous) but have only to be positioned within a predetermined pixel interval distance, that is, may be positioned with one or more pixels intervening therebetween. The predetermined pixel interval distance may be set, that is, how far tow pixels may be spaced from each other in order for the pixels to be expressed that they are continuous, maybe set according to the condition of the original, e.g., state of stain, thin spots, spread of ink and the like on the original. For example, the predetermined pixel interval distance is set to be 2 pixel interval distance, 24 adjacent pixels around each pixel are considered to be continuous with the pixel and a line which is partly cut by thin spots can be considered to be a single line.

The predetermined number of pixels in the set of pixels which are counted as an edge pixel in the modifying step is preferably 1 though need not be limited to 1 so long as it is sufficiently smaller than the number of pixels in the set of pixels.

The halftone determining step may be effected in any manner so long as it is based on the number of the pixels in each block which are determined to be an edge pixel, or the density of the edge pixels in the block.

In the modifying step, any of the continuous pixels, e.g., the pixel at the center of the set of pixels, may be counted as an edge pixel. However in this case, processing to determine which of the pixels is to be counted as an edge pixel becomes necessary, which somewhat complicates the overall processing. Accordingly, it is preferred that only one pixel at a predetermined end of the set of pixels be counted as an edge pixel and the other pixels in the set of pixels be not counted as an edge pixel.

It is preferred that only one pixel at a predetermined end of the set of pixels is counted as an edge pixel as a result of excepting from the edge pixels the pixels which satisfy at least one of the following conditions (1) to (3). In the following conditions, the term "the relevant pixel" means the pixel which is to be determined whether it satisfies the condition.

(1) At least one of pixels which are within said predetermined pixel interval distance from the relevant pixel in the first direction is an edge pixel.

(2) At least one of pixels which are within said predetermined pixel interval distance from the relevant pixel in the second direction on a predetermined side of the relevant pixel is an edge pixel.

(3) At least one of edge pixels which are within said predetermined pixel interval distance from the relevant pixel in the second direction on the side opposite to the predetermined side of the relevant pixel satisfies the condition (1).

It is preferred that the predetermined pixel interval distance in the conditions (1) to (3) be one. When the predetermined pixel interval distance is one, the conditions (1) to (3) are rewritten as the following conditions (4) to (6).

(4) At least one pixel which is directly adjacent to the relevant pixel in the first direction and a pair of pixels which are directly adjacent to the adjacent pixel on opposite sides thereof in the second direction is an edge pixel.

(5) The pixel directly adjacent to the relevant pixel in the second direction on a predetermined side of the relevant pixel is an edge pixel.

(6) At least one of successive edge pixels adjacent to the relevant pixel in the second direction on the other side of the relevant pixel satisfies the condition (4).

The first and second directions may be a main scanning direction and a sub-scanning direction though need not be so.

In accordance with a second aspect of the present invention, there is provided an apparatus for carrying out the method in accordance with the first aspect of the present invention for distinguishing the types of pixels of an image made up of a plurality of pixels arranged in a first direction and a second direction substantially perpendicular to the first direction said apparatus comprising which an edge pixel detecting means which divides the image into a plurality of blocks and counts the number of pixels which are determined to be an edge pixel in each block, and a halftone determining means which determines whether each of pixels in each block is a halftone pixel on the basis of the number of the pixels which are determined to be an edge pixel in the block by the edge pixel determining means, wherein the improvement comprises that the halftone determining means is provided with an edge number modifying means which modifies the number of edge pixels in each block as detected by the edge pixel detecting means, when a plurality of pixels continuous in the first direction and/or the second direction are determined to be edge pixels by the edge pixel detecting means, by counting only a predetermined number of pixels in the set of the pixels consisting of the continuous pixels which are determined to be an edge pixel as an edge pixel, and determines whether each pixel in the block is a halftone pixel on the basis of the modified number of the edge pixels in the block.

It is preferred that the edge number modifying means counts only one pixel at a predetermined end of the set of pixels as an edge pixel.

More specifically, it is preferred that the edge number modifying means comprises a first excepting means which excepts a pixel satisfying the following condition (4) from the edge pixels as detected by the edge pixel detecting means, a second excepting means which excepts a pixel satisfying the following condition (5) from the edge pixels as detected by the edge pixel detecting means, and a third excepting means which excepts a pixel satisfying the following condition (6) from the edge pixels as detected by the edge pixel detecting means.

(4) At least one pixel which is directly adjacent to the relevant pixel in the first direction and a pair of pixels which are directly adjacent to the adjacent pixel on opposite sides thereof in the second direction is an edge pixel.

(5) The pixel directly adjacent to the relevant pixel in the second direction on a predetermined side of the relevant pixel is an edge pixel.

(6) At least one of successive edge pixels adjacent to the relevant pixel in the second direction on the other side of the relevant pixel satisfies the condition (4).

Though a plurality of successive pixels can be determined to be edge pixels at each left-hand or right-hand radical of a Chinese character in the character region, each segment in the line drawing region and each halftone dot in the halftone region, the number of edge pixels in the continuous edge pixel set is larger in the character region and the line drawing region than in the halftone region. Accordingly, when only one or a fraction of the pixels in the set is counted as an edge pixel, the number of edge pixels is more reduced in the character region and the line drawing region than in the halftone region. That is, after the modification, the character region becomes clearly smaller than the halftone region in edge pixel density. Thus, by determining whether each pixel is of a halftone region on the basis of the modified number of the edge pixels, the halftone pixel can be distinguished more precisely without fear that a part in which a number of small characters such as newspaper characters are arranged is mistaken for a halftone region and a line drawing region in which many parallel lines are arranged in a row as in a scale is mistaken for a halftone region.

When only one pixel at a predetermined end of the set of pixels is counted as an edge pixel as a result of excepting from the edge pixels the pixels which satisfy at least one of the aforesaid conditions (1) to (3), processing to determine which of the pixels is to be counted as an edge pixel becomes unnecessary and algorithm for the modifying step and structure of the apparatus can be facilitated.

DESCRIPTION OF THE PREFERRED EMBODIMENT

Figure 1:
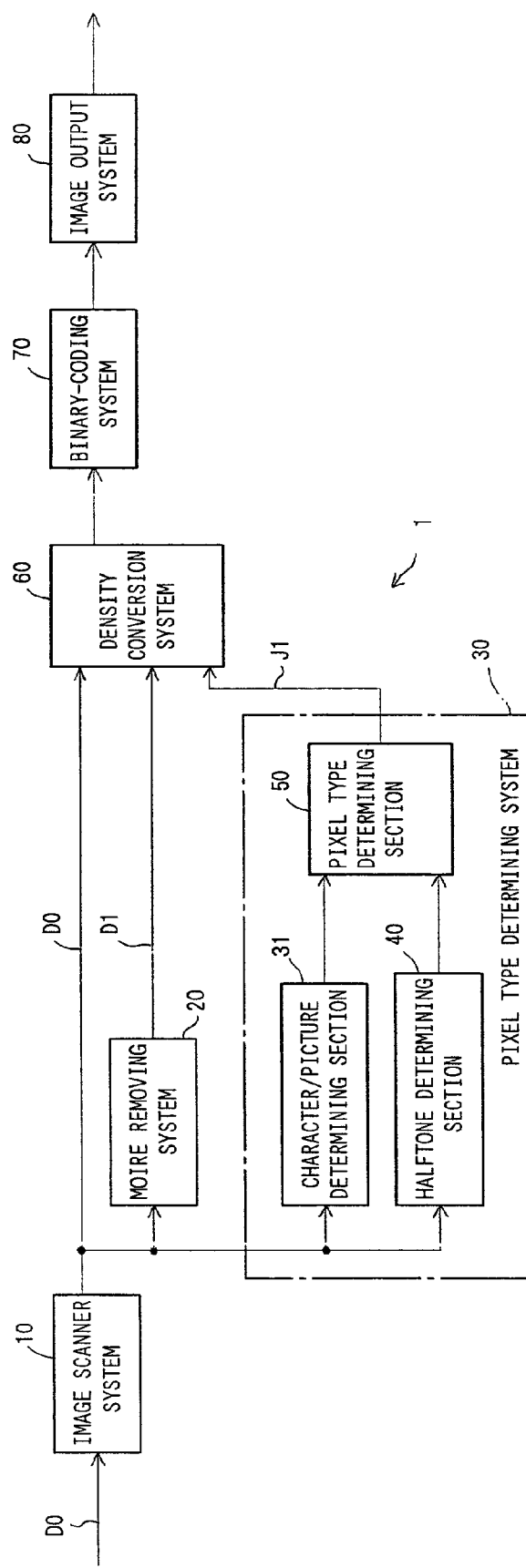
FIG. 1 is a block diagram showing an image processing apparatus provided with a pixel type distinguishing apparatus in accordance with an embodiment of the present invention.

In FIG. 1, an image processing apparatus 1 comprises an image scanner system 10 for taking in an image signal D0, a moiré removing system 20 which removes moiré frequency components included when the image signal D0 represents a halftone image, a pixel type determining system 30 which determines the type of each pixel of the image signal D0, a density conversion system 60 which receives the raw image signal D0 as output from the image scanner system 10, a moiré-free image signal D1 output from the moiré removing system 20 and pixel type information J1 output from the pixel type determining system 30 and carries out on the raw image signal D0 and the moiré-free image signal D1 density conversion on the basis of the pixel type information J1, a binary coding system 70 which binary-codes an image signal D2 output from the density conversion system 60 by an error diffusion method or a dither method, and an image output system 80 which makes a stencil or makes print on the basis of the binary-coded image signal D3 output from the binary-coding system 70.

The moiré removing system 20 carries out smoothing processing on the image signal D0 by the use of a low-pass filter or the like and blurs halftone components.

The pixel type determining system 30 in accordance with an embodiment of the present invention comprises a character/picture determining section 31, a halftone determining section 40 and a pixel type determining section 50.

The character/picture determining section 31 determines whether each pixel of the raw image signal D0 read by the image scanner system 10 is of a character region or of a silver halide photographic region on the basis of the result of edge detection and density information.

The pixel type determining section 50 determines the type of each pixel (that is, which of a character region pixel, a silver halide photographic region pixel and a halftone region pixel each pixel is) of the raw image signal D0 read by the image scanner system 10 on the basis of the result of determination by the character/picture determining section 31 and the halftone determining section 40, and outputs the pixel type information J1 to the density conversion system 60.

The pixel type determining section 50 determines the type of each pixel giving priority to the result of determination by the halftone determining section 40 over the result of determination by the character/picture determining section 31. That is, pixels which are determined to be of a halftone region (to be a halftone pixel) by the halftone determining section 40 are determined to be a halftone region pixel by the pixel type determining section 50 irrespective of whether the character/picture determining section 31 determines the pixels to be of a character region or a picture region. Whereas as for pixels which are determined not to be of a halftone region by the halftone determining section 40, the pixel type determining section 50 determines the types of pixels as those determined by the character/picture determining section 31.

The density conversion system 60 carries out on the moiré-free image signal D1 density conversion for picture while the pixel type information J1 input from the pixel type determining system 50 represents that the pixels are of a halftone region, whereas the density conversion system 60 carries out on the raw image signal D0 density conversion for character or picture while the pixel type information J input from the pixel type determining system 50 represents that the pixels are of a picture region or of a character region.

The halftone determining section 40 determines whether each pixel of the raw image signal D0 is of a halftone region. A pixel which is determined to be of a halftone region by the halftone determining section 40 will be referred to as "a halftone pixel" and a pixel which is determined not to be of a halftone region by the halftone determining section 40 will be referred to as "a non-halftone pixel", hereinbelow. As shown in detail in FIG. 2, the halftone determining section 40 comprises an edge detecting means 41, an edge number modifying means 42, a main scanning direction halftone pixel determining means 44 and a sub-scanning direction halftone pixel determining means 45.

The halftone determining section 40 automatically distinguishes pixels of a halftone region such as a halftone picture region and a screened region included in various documents such as a newspaper, a magazine, or a document made by means of a computer or a word processor. The main scanning direction halftone pixel determining means 44 and the sub-scanning direction halftone pixel determining means 45 determine whether each pixel is a halftone region pixel on the basis of the output of the edge number modifying means 42.

Figure 3:
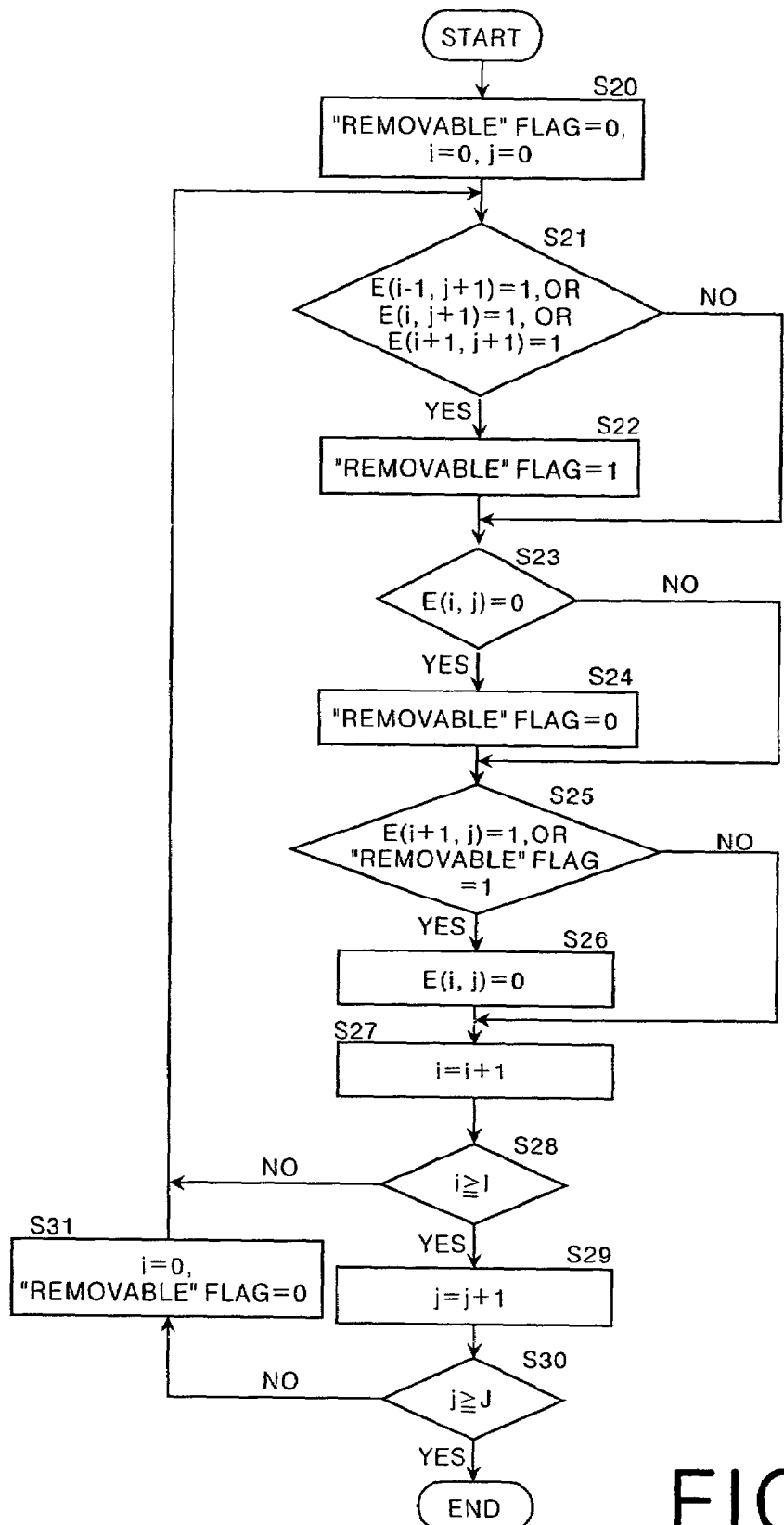
FIG. 3 is a flow chart for illustrating the edge number modifying processing.

Operation of the edge number modifying means 42 will be described in detail, hereinbelow. A processing algorithm on the basis of which the edge number modifying means 42 operates will be described with reference to the flow chart shown in FIG. 3. In accordance with the processing algorithm, when a plurality of continuous pixels (in this particular embodiment, pixels within one pixel interval distance from each other) are determined to be edge pixels by the edge detecting means 41, only the pixel at one end of the set of pixels which are continuous and are determined to be edge pixels by the edge detecting means 41 (such set of pixels will be referred to as "a continuous edge pixel set", hereinbelow) is counted as an edge pixel, and the other pixels in the continuous edge pixel set are not counted as an edge pixel. That is, the edge detecting means 41 outputs 1 for each pixel when the pixel is determined to be an edge pixel and otherwise outputs 0. The output "1" of the edge detecting means 41 is held "1" only for a pixel at one end of the continuous edge pixel set, and the output "1" of the edge detecting means 41 for the other pixels in the continuous edge pixel set is changed to "0".

Specifically, one of the pixels in the continuous edge pixel set is selected and the pixels which satisfy at least one of the following conditions (4) to (6) are excepted from the edge pixels with the selected pixel taken as "the relevant pixel". That is, when the selected pixel (the relevant pixel) satisfies at least one of the following conditions (4) to (6) the output "1" of the edge detecting means 41 for the selected pixel is changed to "0".

(4) At least one pixel which is directly adjacent to the relevant pixel in the first direction and a pair of pixels which are directly adjacent to the adjacent pixel on opposite sides thereof in the second direction is an edge pixel.

(5) The pixel directly adjacent to the relevant pixel in the second direction on a predetermined side of the relevant pixel is an edge pixel.

(6) At least one of successive edge pixels adjacent to the relevant pixel in the second direction on the other side of the relevant pixel satisfies the condition (4).

In this particular embodiment, pixels satisfying the condition (4) are excepted from the edge pixels as detected by the edge pixel detecting means 41 by a first excepting means, pixels satisfying the condition (5) are excepted from the edge pixels as detected by the edge pixel detecting means 41 by a second excepting means, and pixels satisfying the condition (6) are excepted from the edge pixels as detected by the edge pixel detecting means 41 by a third excepting means. The first to third excepting means are not shown and may comprise a microprocessor.

In order to simplify the algorithm for each determination and the structure of the apparatus, determination is made with pixels taken as a relevant pixel one by one from the pixel at the left upper corner of the original rightward (in the main scanning direction), and after all the pixels along the first main scanning line are taken as the relevant pixel, determination is made on the pixels along the next main scanning line in the same manner, whereby determination is made on all the pixels on the original. Each pixel is represented by (i, j) wherein i stands for the number of the pixel as numbered in the main scanning direction and j stands for the number of the pixel as numbered in the sub-scanning direction with the pixel at the left upper corner of the original represented by (0, 0). Accordingly, the condition (4) can be simplified as "at least one of a pixel immediately below the relevant pixel and two pixels on opposite sides thereof in the main scanning direction is an edge pixel", the condition (5) can be simplified as "the pixel directly adjacent to the relevant pixel on the right side thereof is an edge pixel, and the condition (6) can be simplified as "a plurality of successive pixels on the left side of the relevant pixel are edge pixels and at least one of them satisfies the condition (4).

In order to simply executing determination whether the relevant pixel satisfies the condition (6) without use of a line memory, it is preferred to set a "removable" Flag which represents the result of determination whether the relevant pixel satisfies the condition (4). In this particular embodiment, the "removable" Flag is first initialized to "0", and at the same time, pixel (0, 0) is taken as the relevant pixel. (step S20)

Then it is determined whether the three pixels (i−1, j+1), (i, j+1), (i+1, j+1) below the relevant pixel (i, j) are edge pixels as determined by the edge detecting means 41. (step S21) When at least one of the three pixels is an edge pixel, the "removable" Flag is set to "1" in step S22, and otherwise the "removable" Flag is kept as "0".

Then it is determined whether the output of the edge detecting means 41 for the relevant pixel (i, j) is "0" (i.e., the relevant pixel (i, j) itself is an edge pixel as determined by the edge detecting means 41 in step S23). When it is determined that the output of the edge detecting means 41 for the relevant pixel (i, j) is "0" (when the relevant pixel is a non-edge pixel), the "removable" Flag is reset to "0" (step S24), and otherwise, the preceding value of the "removable" Flag is held.

Thus, when the relevant pixel (i, j) satisfies the condition (4), the value of the "removable" Flag becomes "1", and accordingly whether the relevant pixel satisfies the condition (4) can be determined by referring to the value of the "removable" Flag. When the relevant pixel (i, j) is shifted one by one in the main scanning direction, the "removable" Flag is kept at 1 until the output of the edge detecting means 41 turns to "0" after the condition (4) is once satisfied. That is, since the "removable" Flag is kept "1" so long as the condition (6) is satisfied, the "removable" Flag is "1" when the pixels continuous to the relevant pixel (i, j) on the left side of the relevant pixel are edge pixels and satisfy the condition (4). Accordingly whether the relevant pixel satisfies the condition (6) can be determined by referring to the value of the "removable" Flag.

Thereafter, it is determined whether the pixel (i+1, j) on the right side of the relevant pixel (i, j) is an edge pixel as determined by the edge detecting means 41, i.e., whether the output of the edge detecting means 41 for the right side pixel is "1" (E(i+1, j)=1), or the "removable" Flag is "1". (step S25) When it is determined that the output of the edge detecting means 41 for the right side pixel is "1", or the "removable" Flag is "1", the output of the edge detecting means 41 for the relevant pixel (i, j) is changed to "0". (step S26) Otherwise, the preceding output of the edge detecting means 41 for the relevant pixel (i, j) is held. Since whether the output of the edge detecting means 41 for the right side pixel is "1" corresponds to whether the relevant pixel satisfies the condition (5) and whether the "removable" Flag is "1" corresponds to whether the relevant pixel satisfies at least one of the conditions (4) and (6). Accordingly, when the relevant pixel satisfies at least one of the conditions (4) and (6), the output of the edge detecting means 41 for the relevant pixel (i, j) is changed to "0". (step S26) Otherwise, the output of the edge detecting means 41 for the relevant pixel (i, j) is held "1".

Steps S21 to S26 are repeated for all the pixels along one main scanning line by incrementing the value of i one by one (i=i+1) each time step S26 is executed until the value of I reaches the number of the pixels in the main scanning direction i. (steps S27 and S28) Then after all the pixels on the one main scanning line are subjected to the processing, the relevant pixel is shifted to the next main scanning line and pixel (i, j+1) is taken as the relevant pixel with the "removable" Flag initialized to "0" and i initialized to "0". (steps S29 to S31)

FIGS. 4A to 4D show examples of modification of the number of edge pixels according to the algorithm. The hutched pixels in FIGS. 4A to 4D are pixels which are determined to be edge pixels by the edge detecting means 41 but are not counted as an edge pixel by the edge number modifying means 42, that is, pixels the output (E) of the edge detecting means 41 for which is changed from "1" to "0", and the pixels denoted by ☆ are pixels the output (E) of the edge detecting means 41 for which is held "1", that is, pixels which are determined to be edge pixels by the edge detecting means 41 and are counted as an edge pixel also by the edge number modifying means 42.

Figure 4A:
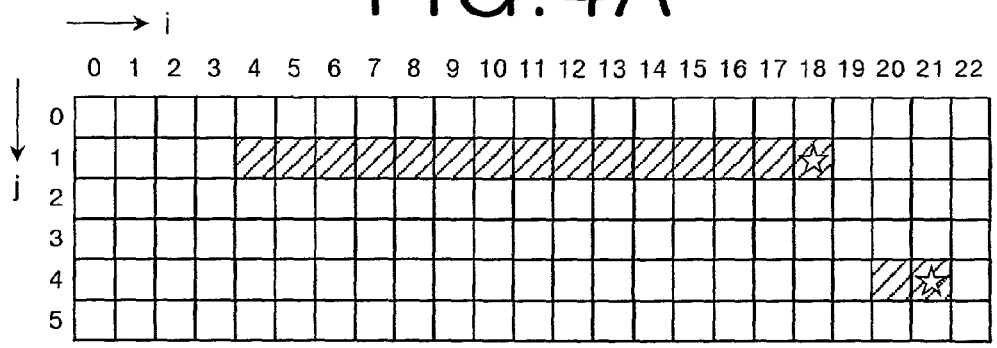
FIGS. 4A to 4D are views for illustrating the algorithm on the basis of which the number of the edge pixels is modified.

When a plurality of pixels continuous in the main scanning direction are edge pixels as shown in FIG. 4A (except the lower right part of FIG. 4A), the output of the edge detecting means 41 for only the rightmost pixel (18, 1) is held "1" and the output of the edge detecting means 41 for all the other pixels are changed to "0" according to the condition (5).

Figure 4B:
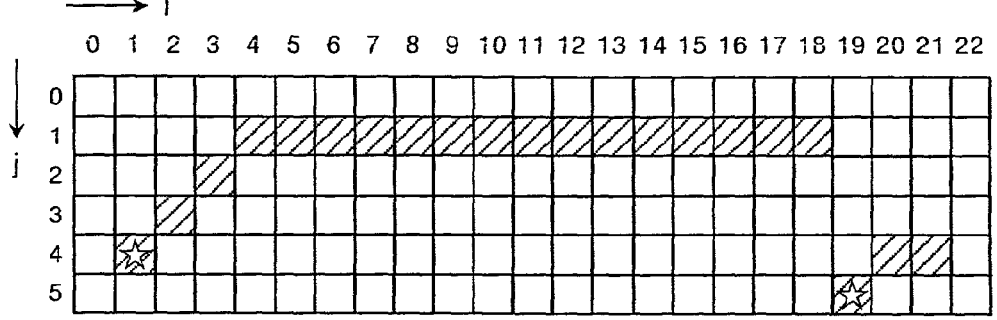
Figure 4C:
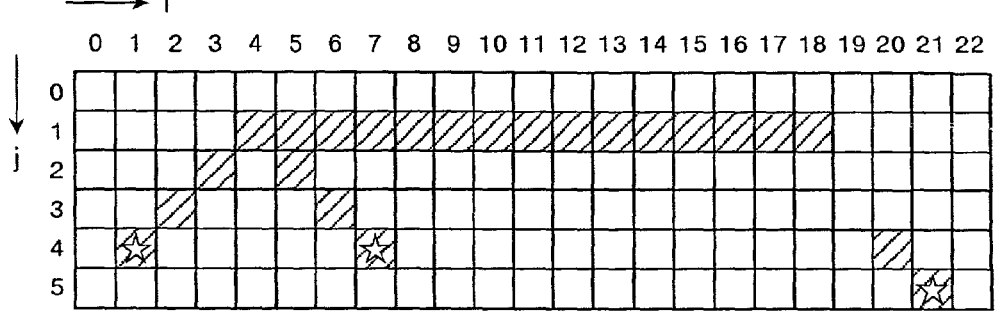
Figure 4D:
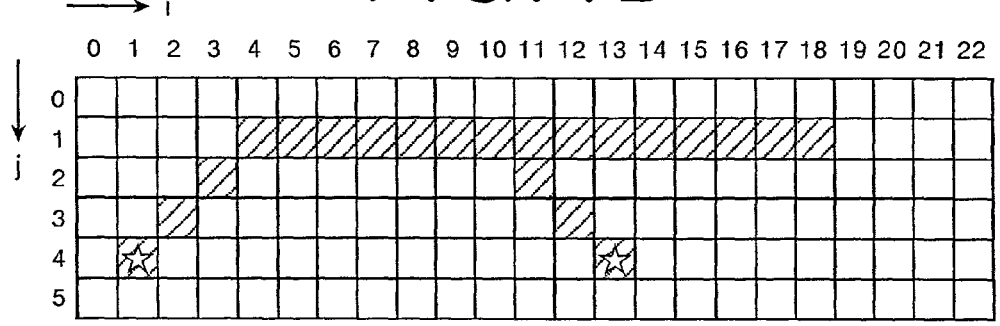

If one of said the other pixels satisfies the condition (4), also the output of the edge detecting means 41 for the rightmost pixel is changed to "0" as shown in FIGS. 4B to 4D according to the condition (6). However, in this case, as a result of carrying out the processing on all the pixels in the continuous edge pixel set, the output of the edge detecting means 41 is held "1" for at least one pixel.

Though, the output of the edge detecting means "41 for only one pixel is generally held "1", the output of the edge detecting means "41 for two or more pixels can be held "1" when the continuous edge pixel set has two or more branches as shown in FIGS. 4C and 4D.

When two pixels continuous in the main scanning direction are edge pixels as detected by the edge detecting means 41 as shown at the lower right part of FIG. 4A, only the left side pixel (20, 4) satisfies the condition (5) and accordingly the output of the edge detecting means 41 for only the left side pixel (20, 4) is changed to "0" and the output of the edge detecting means 41 for the right side pixel (21, 4) is held "1". When left side pixel (20, 4) further satisfies the condition (4) as shown at the lower right part of FIG. 4B, the right side pixel (21, 4) comes to satisfy the condition (6) and the output of the edge detecting means 41 for the right side pixel (21, 4) is also changed to "0". In such a case, which of the pixels (19, 5), (20, 5) and (21, 5) on the lower side of the left side pixel (20, 4) is held "1" is the same as in the aforesaid continuous edge pixel set where a number pixels continuous in the main scanning direction are edge pixels.

When edge pixels are continuous downward (may be either immediately downward or obliquely downward) as shown at the lower right part of FIG. 4C though not continuous in the main scanning direction, the upper pixel (20, 4) satisfies the condition (4) and accordingly the output of the edge detecting means 41 for the upper pixel (20, 4) is changed to "0". In such a case, which of the pixels (19, 5), (20, 5) and (21, 5) on the lower side of the left side pixel (20, 4) is held "1" is the same as in the aforesaid continuous edge pixel set where a number pixels continuous in the main scanning direction are edge pixels.

As can be understood from the examples of modification of the number of edge pixels shown in FIGS. 4A to 4D, when a plurality of continuous pixels are determined to be edge pixels by the edge detecting means 41 to form a continuous edge pixel set, the output of the edge detecting means 41 for each pixel representing whether the pixel is an edge pixel is selectively changed to "0" according to the aforesaid algorithm so that only one or a sufficiently small number (which is sufficiently smaller than the number of pixels in the set) of pixels kept determined to be an edge pixel.

Figure 5A:
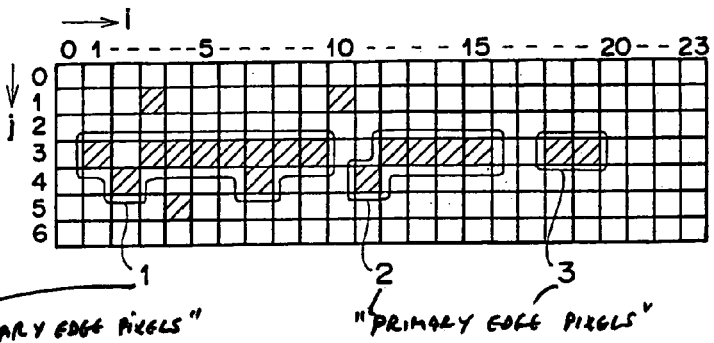
FIGS. 5A to 5D are views showing a concrete example of the edge number modifying processing.
Figure 5B:
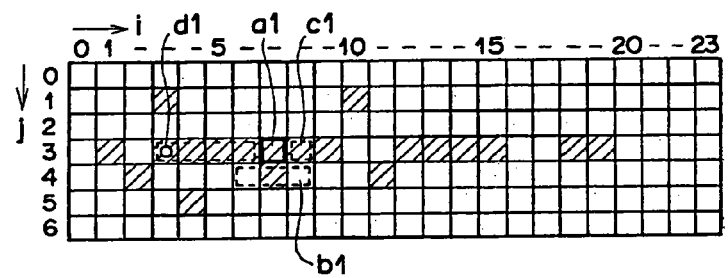
Figure 5C:
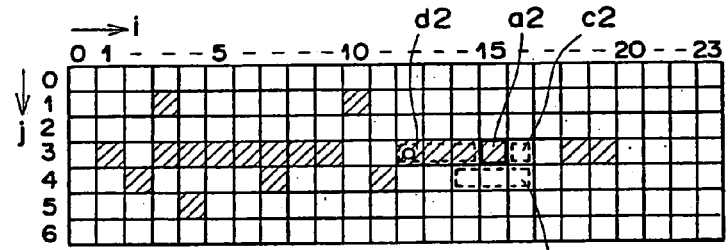
Figure 5D:
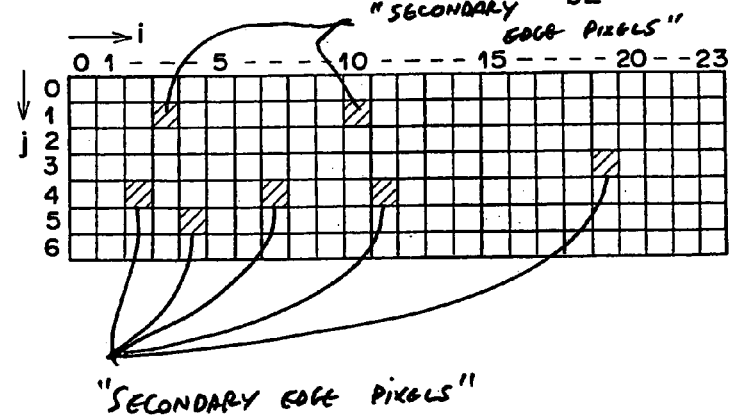

FIGS. 5A to 5D are views showing a concrete example of the processing described above. FIG. 5A shows edge pixels as determined by the edge detecting means 41, FIGS. 5B and 5C show the relation between the relevant pixel and the reference region, and FIG. 5D shows pixels which are still counted as an edge pixel after the edge number modifying processing by the edge number modifying means 42.

It is assumed that the pixels which are determined to be edge pixels by the edge detecting means 41 are as shown in FIG. 5A. When the edge number modifying processing is carried out on the pixels shown in FIG. 5A according to the algorithm shown in FIG. 3, for instance, pixel a1 (7, 3) satisfies the condition (4) since pixel (7, 4) out of the three pixels in the reference region b1 below the relevant pixel a1 (7, 3) is an edge pixel, satisfies the condition (5) since pixel c1 (8, 3) adjacent to the relevant pixel a1 (7, 3) on the right side thereof is an edge pixel, and satisfies the condition (6) since pixel (3, 3) denoted by ○ in the reference region d1 on the left side of the relevant pixel a1 (7, 3) satisfies the condition (4). That is, the relevant pixel a1 (7, 3) satisfies all the conditions (4) to (6). Accordingly, the output of the edge detecting means 41 for the pixel (7, 3) is changed to "0" and in the following processing, the pixel (7, 3) is handled as a non-edge pixel. Further, when pixel a2 (15, 3) is taken as a relevant pixel as shown in FIG. 5C, the relevant pixel a2 (15, 3) does not satisfy the condition (4) nor condition (5) since none of the three pixels in the reference region b2 below the relevant pixel a2 (15, 3) is an edge pixel and pixel c2 (16, 3) adjacent to the relevant pixel a2 (15, 3) on the right side thereof is not an edge pixel, but satisfies the condition (6) since pixel (12, 3) denoted by ○ in the reference region d2 on the left side of the relevant pixel a2 (15, 3) satisfies the condition (4). Accordingly, the output of the edge detecting means 41 for the pixel (15, 3) is changed to "0" and in the following processing, the pixel (15, 3) is handled as a non-edge pixel.

Whether each of the other pixels satisfies at least one of the conditions (4) to (6) is determined. As a result, only pixels (2, 4) and (7, 4) are counted as an edge pixel for the continuous edge pixel set 1 (FIG. 5A), only pixel (11, 4) is counted as an edge pixel for the continuous edge pixel set 2, and only pixel (19, 3) is counted as an edge pixel for the continuous edge pixel set 3 whereas the other pixels in each of the continuous edge pixel sets 1 to 3 are not counted as an edge pixel as shown in FIG. 5D. That is, the output of the edge detecting means 41 is kept "1" for pixels (2, 4), (7, 4), (11, 4) and (19, 3) and changed to "0" for the other pixels in the continuous edge pixel sets 1 to 3. Further, the output of the edge detecting means 41 is held "1" for discrete edge pixels (3, 1), (10, 1) and (4, 5).

As can be understood from the description above, for the continuous edge pixel set, only one or a fraction of the pixels in the set is counted as an edge pixel (determination of the edge detecting means 41 is held "1" for only one or a fraction of the pixels in the set and is changed to "0" for the other pixels in the set). That is, a plurality of successive pixels can be determined to be edge pixels at each left-hand or right-hand radical of a Chinese character in the character region, each segment in the line drawing region and each halftone dot in the halftone region. However, the number of edge pixels in the continuous edge pixel set is larger in the character region and the line drawing region than in the halftone region. Accordingly, when only one or a fraction of the pixels in the set is counted as an edge pixel, the number of edge pixels is more reduced in the character region and the line drawing region than in the halftone region. That is, the determination of the edge detecting means 41 is changed from "1" to "0" for a larger number of pixels in the character region and the line drawing region than in the halftone region, and accordingly, after the modification, the character region becomes clearly smaller than the halftone region in edge pixel density.

Figure 2:
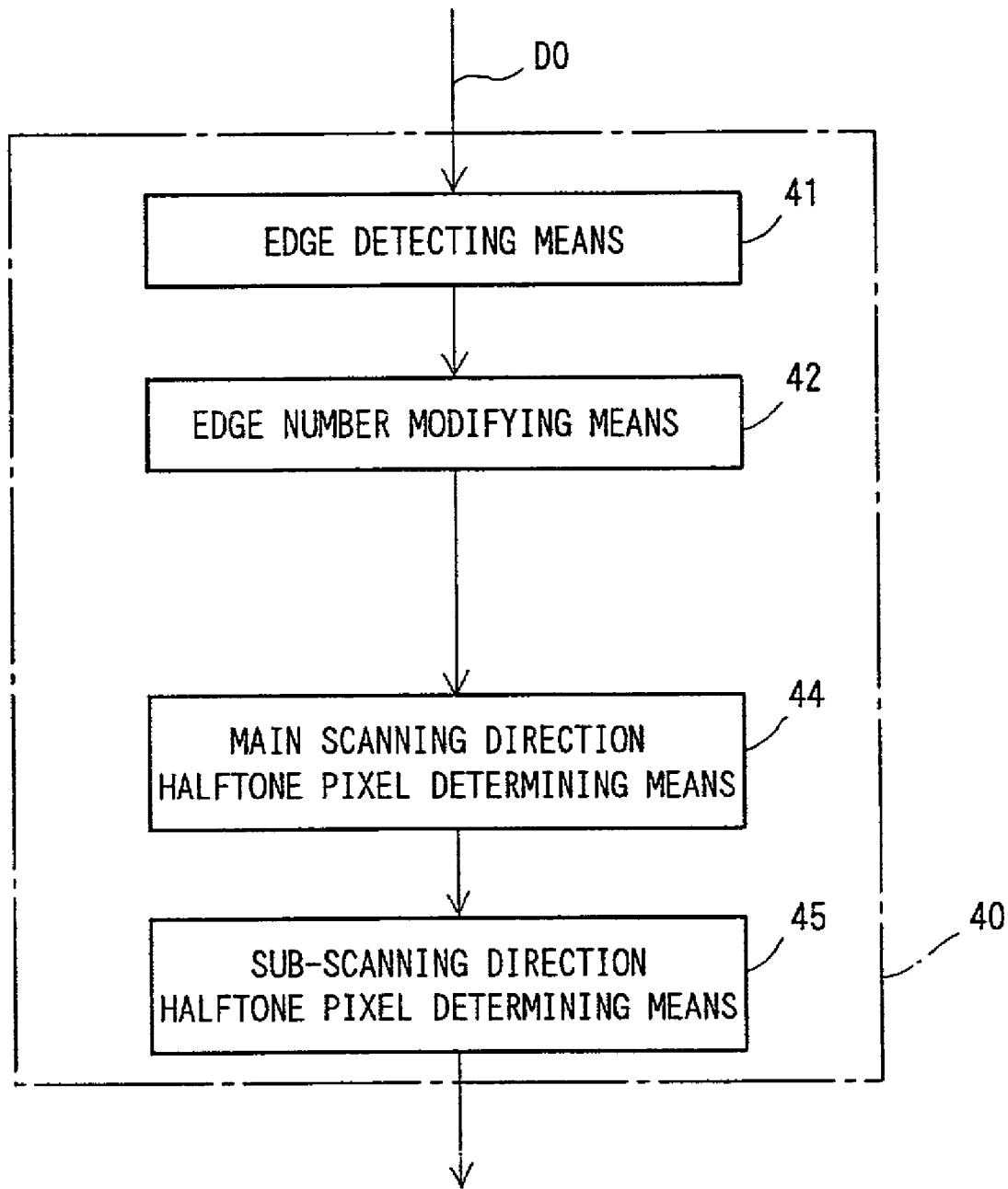
FIG. 2 is a block diagram showing in detail the halftone determining section in the image processing apparatus.

As shown in FIG. 2, the output of the edge number modifying means 42 is input into the main scanning direction halftone pixel determining means 44 and the sub-scanning direction halftone pixel determining means 45, which determine whether each pixel is a halftone pixel on the basis of the output of the edge number modifying means 42. The algorithm according to which the main scanning direction halftone pixel determining means 44 and the sub-scanning direction halftone pixel determining means 45 determine whether each pixel is a halftone pixel may be a known algorithm. Thus, in accordance with the embodiment, the halftone pixel can be distinguished more precisely without fear that a part in which a number of small characters such as newspaper characters are arranged is mistaken for a halftone region and a line drawing region in which many parallel lines are arranged in a row as in a scale is mistaken for a halftone region.

The halftone determining section 40 is the same as the conventional halftone determining section except the edge number modifying means 42 and the algorithms used in the edge detecting means 41, the main scanning direction halftone pixel determining means 44 and the sub-scanning direction halftone pixel determining means 45 may be the same as the conventional algorithms.

The main scanning direction halftone pixel determining means 44 takes as a prospective halftone region a region where edges as modified by the edge number modifying means 42 exist in a number larger than a predetermined value continuous with each other within a predetermined space on one main scanning line. Since edges exist in a half tone picture region in a larger number than in a character region or a picture region, whether the relevant region is halftone region can be determined by this processing. Then the sub-scanning direction halftone pixel determining means 45 counts a number of pixels which are in the prospective halftone region determined by the main scanning direction halftone pixel determining means 44 and are in a reference region around the relevant pixel which is one pixel interval distance in width and a predetermined pixel interval distance in height, and takes the relevant pixel as a final prospective halftone pixel when the number of the pixels is larger than a predetermined threshold value. Even a pixel in the prospective halftone region determined by the main scanning direction halftone pixel determining means 44 is not determined to be a halftone pixel unless it satisfies the condition above. The processing of determining a half tone pixel is described in more detail, for instance, in Japanese Unexamined Patent Publication Nos. 2(1990)-274174 and 5(1993)-344331.

Though, in the embodiment described above, the relevant pixel is shifted rightward one by one from pixel (0, 0) at the upper left corner of the original and after the processing is carried out on all the pixels on one main scanning line, the processing is carried out in the same manner on the pixels on the next main scanning line in order to facilitate the processing, the relevant pixel may be set in different ways.

Though, in the embodiment described above, steps S21 to S26 are carried out on all the pixels on the original, the steps may be carried out only on the pixels which are determined to be edge pixels by the edge detecting means 41.

What is claimed is:

1. A method of distinguishing the types of pixels of an image made up of a plurality of pixels arranged in a first direction and second direction substantially perpendicular to the first direction in which the image is divided into a plurality of blocks, the number of pixels which have been determined to be an edge pixel in each block is counted, and whether each of pixels in each block is a halftone pixel is determined on the basis of the number of the pixels which are determined to be an edge pixel in the block, said method comprising the steps of:

modifying the number of edge pixels in each block according to a location of each of said number of edge pixels, when a plurality of pixels continuously located in the first direction and/or the second direction have been determined to be edge pixels, by counting only a predetermined number of pixels in the set of the pixels consisting of the continuous pixels which have been determined to be an edge pixel as an edge pixel, and determining whether each pixel in the block is a halftone pixel on the basis of the modified number of the edge pixels in the block.

2. A method as defined in claim 1 in which only one pixel at a predetermined end of the set of pixels is counted as an edge pixel and the other pixels in the set of pixels are not counted as an edge pixel.

3. A method as defined in claim 2 in which only one pixel at a predetermined end of the set of pixels is counted as an edge pixel as a result of excepting from the edge pixels the pixels which satisfy at least one of the following conditions (1) to (3);

(1) At least one of the pixels which are within said predetermined pixel interval distance from a relevant pixel in the first direction is an edge pixel;

(2) At least one of pixels which are within said predetermined pixel interval distance from the relevant pixel in the second direction on a predetermined side of the relevant pixel is an edge pixel; and (3) At least one of edge pixels which are within said predetermined pixel interval distance from the relevant pixel in the second direction on the side opposite to the predetermined side of the relevant pixel satisfies the condition (1).

4. A method as defined in claim 3 in which the predetermined pixel interval distance in the conditions (1) to (3) is one pixel interval distance.

5. An apparatus for carrying out a method of distinguishing the types of pixels of an image made up of a plurality of pixels arranged in a first direction and a second direction substantially perpendicular to the first direction, said apparatus comprising:

an edge pixel detecting means which divides the image into a plurality of blocks and counts the number of pixels which have been determined to be an edge pixel in each block;

and a halftone determining means which determines whether each of pixels in each block is a halftone pixel on the basis of the number of pixels which are determined to be an edge pixel in the block by the edge pixel determining means, wherein the halftone determining means is provided with an edge number modifying means which modifies the number of edge pixels in each block as detected by the edge pixel detecting means according to a location of each of said number of edge pixels, when a plurality of pixels continuous in the first direction and/or the second direction have been determined to be edge pixels by the edge pixel detecting means, by counting only a predetermined number of pixels in the set of the pixels consisting of the continuous pixels which have been determined to be an edge pixel as an edge pixel, and determines whether each pixel in the block is a halftone pixel on the basis of the modified number of the edge pixels in the block.

6. An apparatus as defined in claim 5 in which the edge number modifying means counts only one pixel at a predetermined end of the set of pixels as an edge pixel.

7. An apparatus as defined in claim 6 in which the edge number modifying means comprises:

a first excepting means which excepts a pixel satisfying the following condition (1) from the edge pixels as directed by the edge pixel detecting means, a second excepting means which excepts a pixel satisfying the following condition (2) from the edge pixels as detected by the edge pixel detecting means, and a third excepting means which excepts a pixel satisfying the following condition (3) from the edge pixels as detected by the edge pixel detecting means:

(1) At least one pixel which is directly adjacent to a relevant pixel in the first direction and a pair of pixels which are directly adjacent to the adjacent pixel on opposite sides thereof in the second direction is an edge pixel;

(2) The pixel directly adjacent to the relevant pixel in the second direction on a predetermined side of the relevant pixel is an edge pixel; and (3) At least one of successive edge pixels adjacent to the relevant pixel in the second direction on the other side of the relevant pixel satisfies the condition (1).

* * * * *